(12) United States Patent
Liese et al.

(10) Patent No.: US 6,425,096 B1
(45) Date of Patent: Jul. 23, 2002

(54) METHOD AND SYSTEM FOR AUDIO PORTION TEST MANAGEMENT IN A CLIENT/SERVER TESTING ARCHITECTURE

(75) Inventors: William R. Liese, Allen; Kevin K. Watson, Flower Mound; David L. Florcik, Allen; Craig E. Newman, Wylie; Brian S. Badger, Dallas, all of TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/224,499

(22) Filed: Dec. 31, 1998

(51) Int. Cl.[7] .............................................. G06F 11/263
(52) U.S. Cl. .......................................... 714/43; 714/32
(58) Field of Search .............................. 714/43, 32, 46, 714/738, 33; 345/335

(56) References Cited

U.S. PATENT DOCUMENTS

| | | | | |
|---|---|---|---|---|
| 4,800,488 A | * | 1/1989 | Agrawal et al. | 364/200 |
| 5,005,122 A | * | 4/1991 | Griffin et al. | 364/200 |
| 5,325,527 A | * | 6/1994 | Cwikowski et al. | 395/650 |
| 5,371,883 A | * | 12/1994 | Gross et al. | 395/575 |
| 5,471,521 A | * | 11/1995 | Minakami et al. | 379/88 |
| 5,633,909 A | * | 5/1997 | Fitch | 379/15 |
| 5,822,397 A | * | 10/1998 | Newman | 379/6 |
| 5,854,889 A | * | 12/1998 | Liese et al. | 714/43 |
| 5,940,472 A | * | 8/1999 | Newman et al. | 379/1 |
| 6,189,031 B1 | * | 2/2001 | Badger et al. | 709/224 |
| 6,192,108 B1 | * | 2/2001 | Mumford et al. | 379/9 |

OTHER PUBLICATIONS

Ananda et al., "ASTRA–An Asynchronous Remote Procedure Call Facility", 1991, IEEE, pp. 172–179.*
"Computer dictionary", 1997, Microsoft Press, 3rd ed., p. 92.*

* cited by examiner

Primary Examiner—S Baderman

(57) ABSTRACT

Provided is a method and system for managing audio portions of test cases with the respective test case so that the tester (client) has access to the audio portion of test cases. Providing this functionality is particularly novel in that audio is captured within a heterogeneous client/server test environment wherein a single tester from a single client interface can test on any of a variety of test platforms. This invention allows managing audio test portions of test cases with the respective test case so that the tester (client) has access to the audio portion of test cases interactively, or at some future time. The management of the test cases is appropriately performed in the heterogeneous client/server environment. In one embodiment, the test unit(s) connected to the custom server provide an interface to perform recording of the voice path of the test case telephone call. In another embodiment, a recording tap is placed on the voice path of the test case telephone call at off-hook, and then the recording tap is removed at call termination. The tap may be attached directly to a phone line or trunk. The tap may be inherent in a speaker-phone-like configuration of the custom server.

26 Claims, 8 Drawing Sheets

EVENT: User Invokes Client Machine

EVENT: User Executes An Edited Or Unedited Test Case

METHOD AND SYSTEM FOR AUDIO PORTION TEST MANAGEMENT IN A CLIENT/SERVER TESTING ARCHITECTURE

BACKGROUND

The present invention relates to the testing of network environments, and more specifically to a method and system for heterogeneous telecommunications network testing by a plurality of users.

Telecommunications networks have evolved to encompass a variety of services, platforms, applications, data processing system hardware and equipment, referred to as network products. Before deploying network products into a network environment, it is important to first test the network products to ensure their proper operation using devices for testing and for facilitating the testing of telecommunication networks and network products. For example, the SAGE 930A is a test unit that supports a data processing system command interface for performing in-band, or voice-circuit, testing of network products. A software application that executes in a computer can be used to drive the SAGE 930A through a serial connection. Additionally, with the proliferation of out-of-band (non-voice) ISDN and SS7 implementations in telecommunication networks today, additional types of test units such as the Ameritec AM2 Niagra, Telesynch 1567, and HP500 IDACOM are available to test out-of-band signaling transactions of a telecommunications network. These test units can also be driven by a data processing system software application that communicates to the test unit via commands over a serial connection.

A problem with such test devices is that they typically require a command interface which is dedicated to accomplishing a narrowly defined particular test objective and is therefore both cumbersome and time consuming to use. Batch files which automate a series of commands from a data processing system to the test device can be used to alleviate this problem with test devices; the use of batch files do not require data entry of command to the connected test device. A single batch file, or small set of batch files, which contains all the commands necessary to accomplish a particular test objective is invoked. The user is then free to perform other tasks while specific testing is automated.

Still other test improvements have been made through the advent of a graphical user interface (GUI). Programmers have created GUIs to make use of test devices user-friendly. Complicated test scenarios that would otherwise require many commands, or a multiplicity of synchronized batch files, are now achieved through a simple user interface method. Mouse selections, menu options, buttons, drag and drop techniques, and other GUI methods, are provided for enhancing the quality and efficiency of performing telecommunications network testing.

Local Area Network (LAN) technology and communication architectures have also enhanced the testing of network products. GUIs are conveniently located, either locally or remotely, to a particular data processing system that drives the actual testing of network products. This methodology is referred to as client/server technology. The GUI is an application, referred to as a client, which executes on a system in the network. A software application that satisfies requests of a client is referred to as a server. The server also executes on a system in the network. The client/server framework preferably allows a client to be located on any system in the network, even on the same system on which the server resides.

The server traditionally synchronizes a multiplicity of clients-to-server functions, but there are many problems with synchronization within a telecommunications network test environment. Resources, such as available trunks, switches, automatic response units, automatic call distributors, credit card validators, network technology, etc., that are needed by one type of test may circumvent completion of another type of test, which needs the same resources. The server must properly synchronize test requests to the various resources available at the time of the test request.

With many varieties of network products and methodologies for testing of network products currently available, test devices must be proficient in testing a great number of applications and the many varieties of test cases associated with these applications. Thus, a test device has to be capable of learning new test case formats and new test interfaces as required. A test case defines how a particular test will be performed. For example, a test case may simply be a batch file which performs a test, or a test case may be a file of commands or directives maintained with a GUI. Additionally, a test case may be a memory structure which is built by a data processing system upon use of a client or other application. Whatever the embodiment, a test case embodies the action which will take place in order to perform a test.

Yet another problem is managing a multiplicity of tests to be performed on a limited number of test devices. Test labs may have limited test device equipment so testers typically share the test equipment. Human maintained schedules have been deployed which correspond to network configurations that are to be in place according to that schedule. While there have been some automated synchronization techniques provided, there is currently no method and system for synchronizing all testers of a heterogeneous lab environment with the test that will be performed in the laboratory. Currently, all types of test that can be performed in telecommunications are accomplished with a plethora of applications, systems, test case types, and methods.

Therefore, there is an unmet need in the art for users in a network environment to be able to share test cases and the results of executed test cases on the network. This need extends to all the test environments in the network environment, such as all the tests available in an entire testing laboratory. Furthermore, there is an unmet need in the art to allow a single user in the network environment to perform an arbitrary test case or to perform any type of test case that can be performed in an entire laboratory. Additionally, there is an unmet need to be able to perform any type of test case without knowing the test case formats and methodologies of each and every test case available for execution on the network.

SUMMARY

The present invention involves a method and a system for heterogeneous network testing by a plurality of users. It requires at least one client machine, an execution server, and at least one custom server in a local area network (LAN) or wide area network (WAN) environment for heterogeneous network testing in which one or more client machines communicate with the execution server which in turn manages one or more custom servers that execute requested test cases. The custom servers may be of various types, including ISDN servers, SS7 servers, and CG servers. A user on the network communicates to a client machine via a graphical user interface (GUI) to determine which test case or test cases are to be executed. The requested test cases are retrieved and may be edited by the user on the client machine prior to communicating the test case information from the client machine to the execution server which coordinates the execution of test cases by an appropriate custom server. The results of the executed test case are stored and made available to other users on the network.

The client machine includes a GUI for performing tests on a variety of equipment using a variety of test cases. The client machine provides authentication abilities to ensure validation of users. The GUI of the client machine provides a user-friendly interface for managing test cases and for conveniently maintaining (e.g. create, change, delete, store, access, etc.) test cases of new or existing platforms by the client machine, a generic test case can be maintained thereafter. The generic test case is easily directed to an arbitrary environment for performing a test. The client machine has access to file servers containing test cases and database servers for access to test cases. The client machine manages its own set of generic test cases locally or through its own file servers. Multiple users can share test cases maintained by the present invention through their respective client machines to shared file servers.

When a test case is ready for execution, the user selects a single test case or a plurality of test cases for either interactive execution or scheduled execution of the test case. An interactive execution allows the user to see the results of the executed test request as they become available, i.e. "real time". The results of the executed test are made available to the user before the client machine performs any other functions. When the results of the executed test are provided to the user, they are also provided to a correlated test output file where they may be later retrieved for perusal at some later time. A scheduled execution, on the other hand, runs a background task and is therefore transparent to the user. The results of the executed test will only be directed to the correlated test output file for convenient perusal at some future time. The user may specify to run the request now or at a later scheduled time.

For every test requested issued from a client, a priority is assigned to that test request before being transmitted to the execution server. The execution server manages the request according to the priority of the test requested and other tests in progress. The execution server supervises prioritization and scheduling of test requests from all client machines on the network. The execution server accesses information about which lab resources are to be used for specific types of test requests in accordance with presently available test resources. The information available to the execution server includes information about which custom server the execution server must transmit the test request to in order to perform the requested test(s) and which circuit(s) on which trunk(s) will be used to perform the telecommunications activity associated with the test request(s). Thus, the information available to the execution server allows network resources to be preallocated for certain types of tests. It is the responsibility of the execution server to synchronize all client machines that requested test cases to the currently available resources. The execution server also performs loop through tests prior to testing to assure that resources are actually available, i.e. not in error or failure.

The execution server is the supervisory server for platforming all requested test cases in the lab environment. Thus, execution server conveys protocol for successful completion of test request(s) to custom servers that ultimately perform the requested test case(s). The execution server also manages the optional step of retrieving appropriate billing information upon execution of the requested test cases and then matching associated billing information with the appropriate test case results. The billing information of executed test cases may be accessed if desired by the user.

A custom server is responsible for performing specific types of test cases. A custom server may have a plurality of test devices connected to it, or it may be directly connected to the environment that it will test. Typically, a custom server receives and executes one type, or one category, of test cases. For example, one custom server may handle all ISDN test cases. Another custom server in the network may handle all SS7 test cases. Yet another custom server may handle all test cases for a particular manufacturer of connected test devices. There may be many custom servers in the network, each of which handles some set of test cases as logically determined by a person who has knowledge of how best to plan use of a telecommunications network lab. The physical layout of the lab topology may be optimized by appropriate use of custom servers on the telecommunications network.

Each custom server test execution is limited by the execution server. The custom server performs test cases and saves test results of the test case that it communicates back to the execution server. A custom server may include a graphical user interface (GUI) that provides tracing mechanisms and service manager support functions dependent on the type of custom server and its processing. In one embodiment, the custom server manages a client's interactive test request embodiment, the custom server completes the test case and the test output, communicates status back to the execution server, and then the execution server communicates output back to the client.

DETAILED DESCRIPTION

The present invention describes a method and system for heterogeneous network testing of network products by a plurality of users. In addition to the heterogeneous telecommunications network testing discussed herein, the present invention is suitable for use in any network environment. Users who request testing of network products need not know how to use more types of network product environments, because the present invention can be used as a single application for performing myriad of tests on the network.

In the client/server test architecture of the present invention, a single client machine or multiple client machines may access and drive one or more custom servers deployed on a network via an execution server to perform any test capable of being performed on the network. Various types of Custom Servers, such as ISDN server, SS7 servers and CG servers, are deployed in a local area network (LAN) or a wide area network (WAN) environment such that the client may access and drive any number of custom servers deployed on the network. The client simply communicates which test cases are to be executed to a client machine. Client machine may be any kind of machine, such as a PC (personal computer), a processor card, UNIX platform, etc. This test case information is communicated from the client machine to an execution server that coordinates the execution of test cases by an appropriate custom server from a plurality of custom servers. A new custom server is deployed as needed to perform test cases. The custom server resources on the network are pooled to avoid unnecessary duplication of servers so that less equipment can be used. Client machines in the network may pool and share test results and equipment. In this manner, the present invention allows for a robust network test environment.

Figure 1:
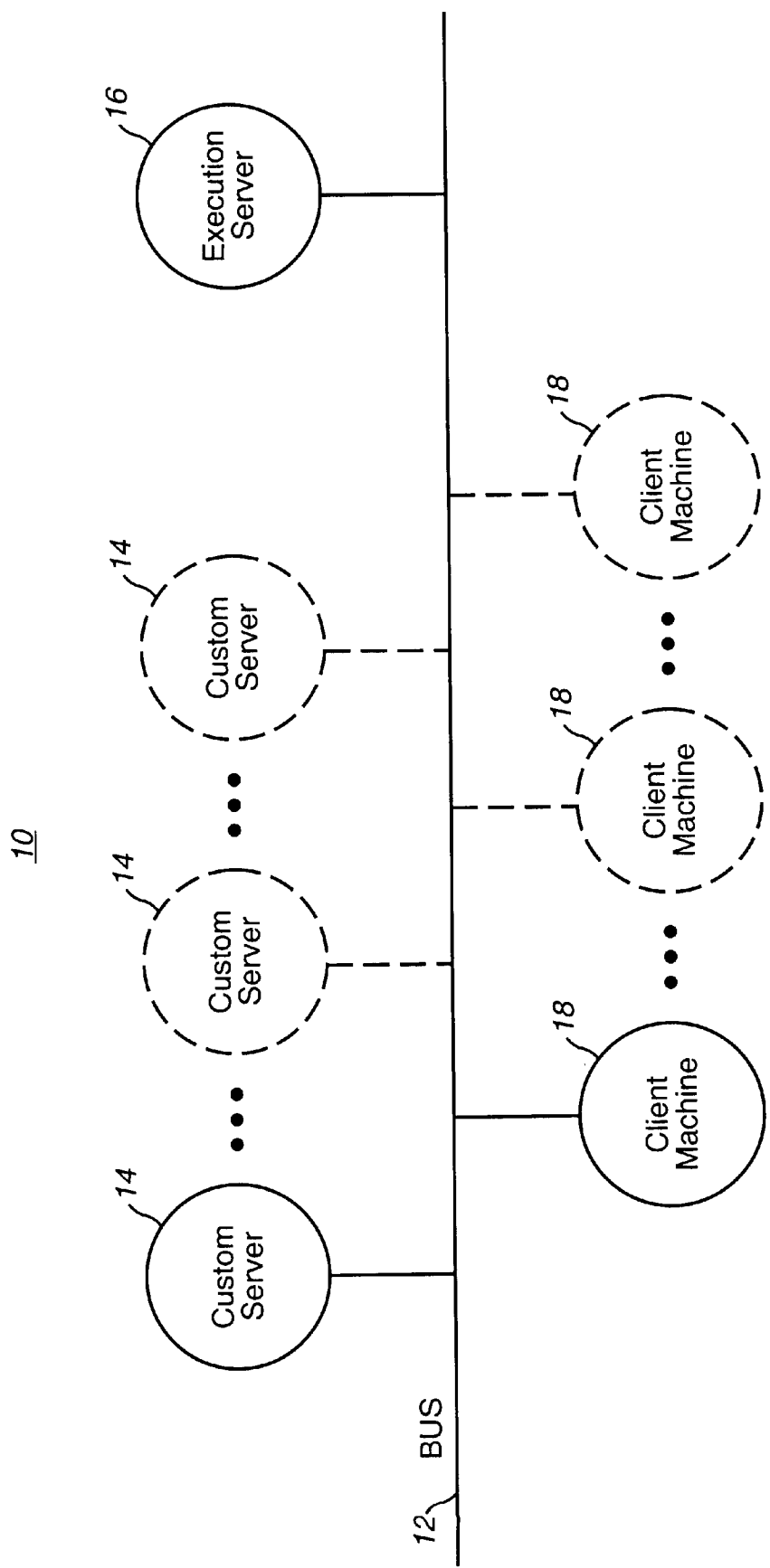
FIG. 1 is a simplified block diagram of client/server test architecture, according to the present invention.

Referring to FIG. 1, a simplified block diagram of the client/server test architecture of the present invention is shown. Client/Server Test Architecture 10 is composed of a bus 12 that connects the major components of the architecture: Custom Servers 14, Execution Server 16 and Client Machines 18. Client/Server Test Architecture may be used in either a LAN (local area network) or WAN (wide area network) environment, or any other computer environment. Bus 12 can be configured in any topology desired, such as a ring or daisy chain topology, independent of the LAN or WAN topology of the system so long as there is a communications link between Client Machine(s) 18 and Execution Server 16 and a communications link between Execution Server 16 and Custom Server(s) 14.

A user on the network uses Client Machine 18 to request that a particular type of test case be performed; as indicated by the dashed lines of FIG. 1 any number of users may access the system via a plurality of Client Machines 18. The test case request is received by Execution Server 16. The Execution Sever 16, in turn, manages communications with Custom Server 14 that actually executes the requested test case. Any number of Custom Servers 14 may be used as indicated by the dashed lines of FIG. 1. Types of Custom Servers 14 include ISDN (Integrated Services Digital Network) servers, CG (Call Generator) servers and SS7 (Signaling System 7) servers, a type of CSS7 (Common Channel Signaling System 7) servers. Custom Server 14 may be any type of server required to execute the test cases requested by the user. Each Custom Server 14 may have its own type of tests it can run and thus different test cases may be run on different Custom Servers 14.

Figure 2:
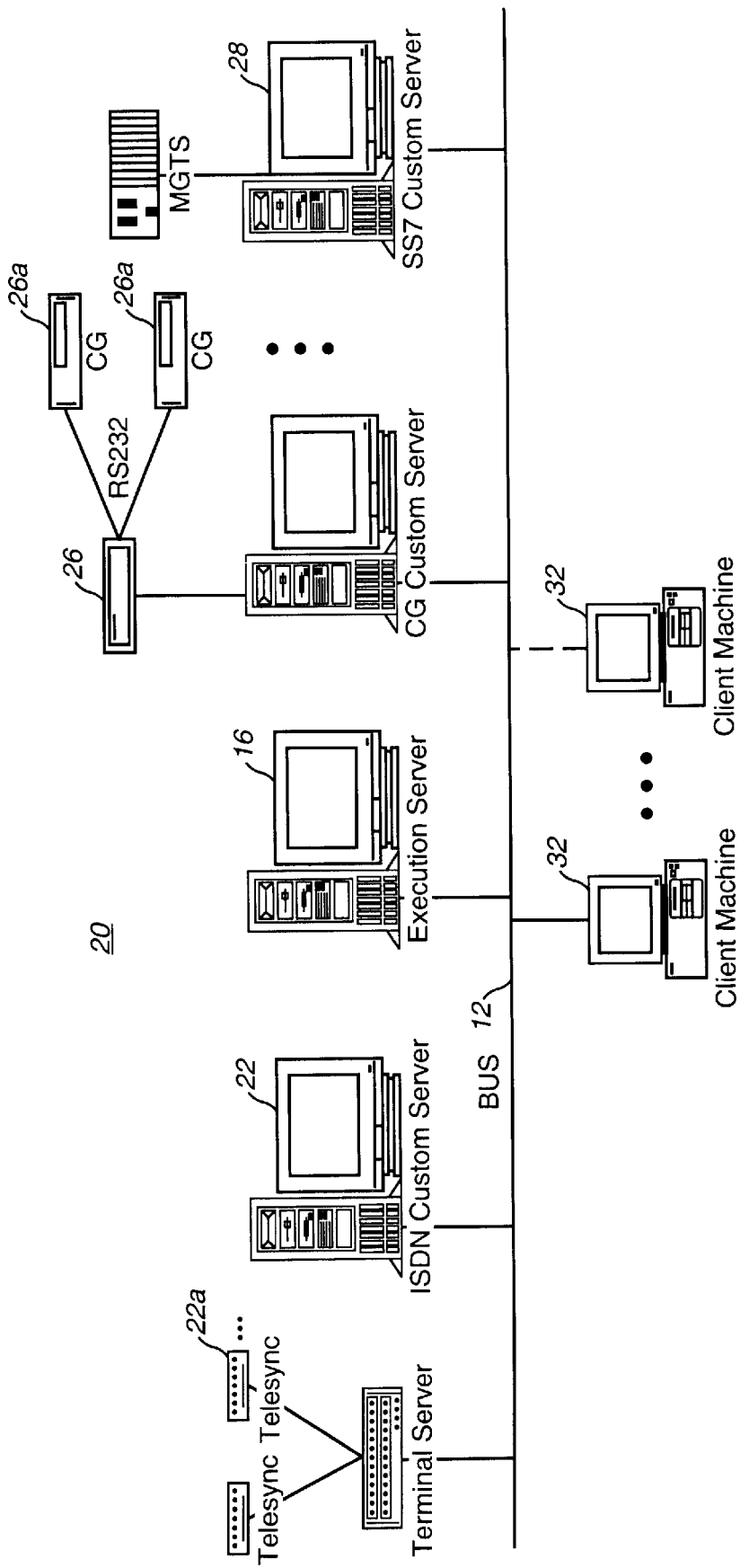
FIG. 2 is a more detailed block diagram of client/server test architecture of the present invention.

Referring to FIG. 2, a more detailed block of the Client/Server Test Architecture 20 of the present invention is shown. The elements shown in FIG. 2 are connected by BUS 12 and include ISDN Custom Server 22, Terminal Server 22a, Execution Server 16, CG Custom Server 26, SS7 Custom Server 28, and Client Machine 18. Many types of custom servers may exist in the test network. In FIG. 2, ISDN Custom Server 22, CG Custom Server 26 and SS7 Custom Server 28 are shown. Each Custom Server 22, 26, 28 manages test multitasking, meaning it must be capable of generating a process thread. Each custom server can run on a variety of operating systems such as Microsoft NT, OS/2, UNIX, and Macintosh operating systems.

ISDN Custom Server 22 provides shared access to a number of Telesync boxes; for instance, twenty-four Telesync TSI1565 boxes or any number of Telesync boxes can be used. Terminal Server 22a provides the RS232 serial connection used by ISDN Custom Server 22. SS7 Custom Server 28 provides shared access to an SS7 message generator unit for the origination of SS7 test cases and in that regard manages SS7 protocols, releasing the call from the originator. The number of RS232 serial ports utilized by SS7 Custom Server 28 may be expanded up to the number of RS232 ports available on the Server Machine 28. CG Custom Server 26 provides shared access to bulk generators 26a for in-band originations and voice path verification for SS7 test cases. The number of bulk call generators 26a may be expanded up to the number of RS232 ports that are available on the Server Machine 26.

Execution Server 16 ensures that users logged onto Client Machines 32 can simultaneously access and drive a number of Custom Servers 22, 26 and 28 which manage the execution of requested test cases. Execution Server 16 probes a test request generated by Client Machine 32 and routes the test request to the appropriate Custom Server(s) which actually performs the requested test case. The operation of Execution Server 16 is transparent to the user logged onto Client Machine 32. Execution Server 16 is preferably a multitasking machine, meaning it must be a machine capable of generating multiple process threads. Execution Server 16 can run on a variety of operating systems including Microsoft NT, OS/2, UNIX, or Macintosh.

Figure 3:
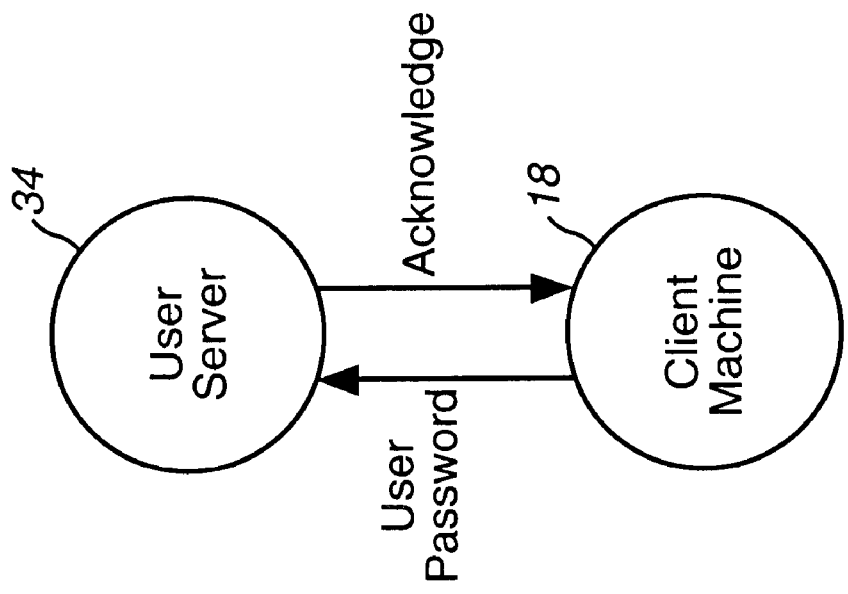
FIG. 3 shows an event in which a user invokes the client machine, according to the present invention.

Referring to FIG. 3, a user of the present invention invokes Client Machine 18. Validation of the user's name, password and custom server identification is performed by User Server 34 as the user logs onto the Client Machine 18. The user refers to the desired Custom Server 14 shown in FIG. 1 either by name, number or other appropriate identifier, depending on how User Server 34 is configured. The name, number or other identifier of the desired Custom Server 14 is stored in local memory of the Client Machine 18 and may be accessed and verified by reference to a look-up table in local memory. Communication between the user and Client Machine 18 may be accomplished with a GUI (graphical user interface).

Figure 4:
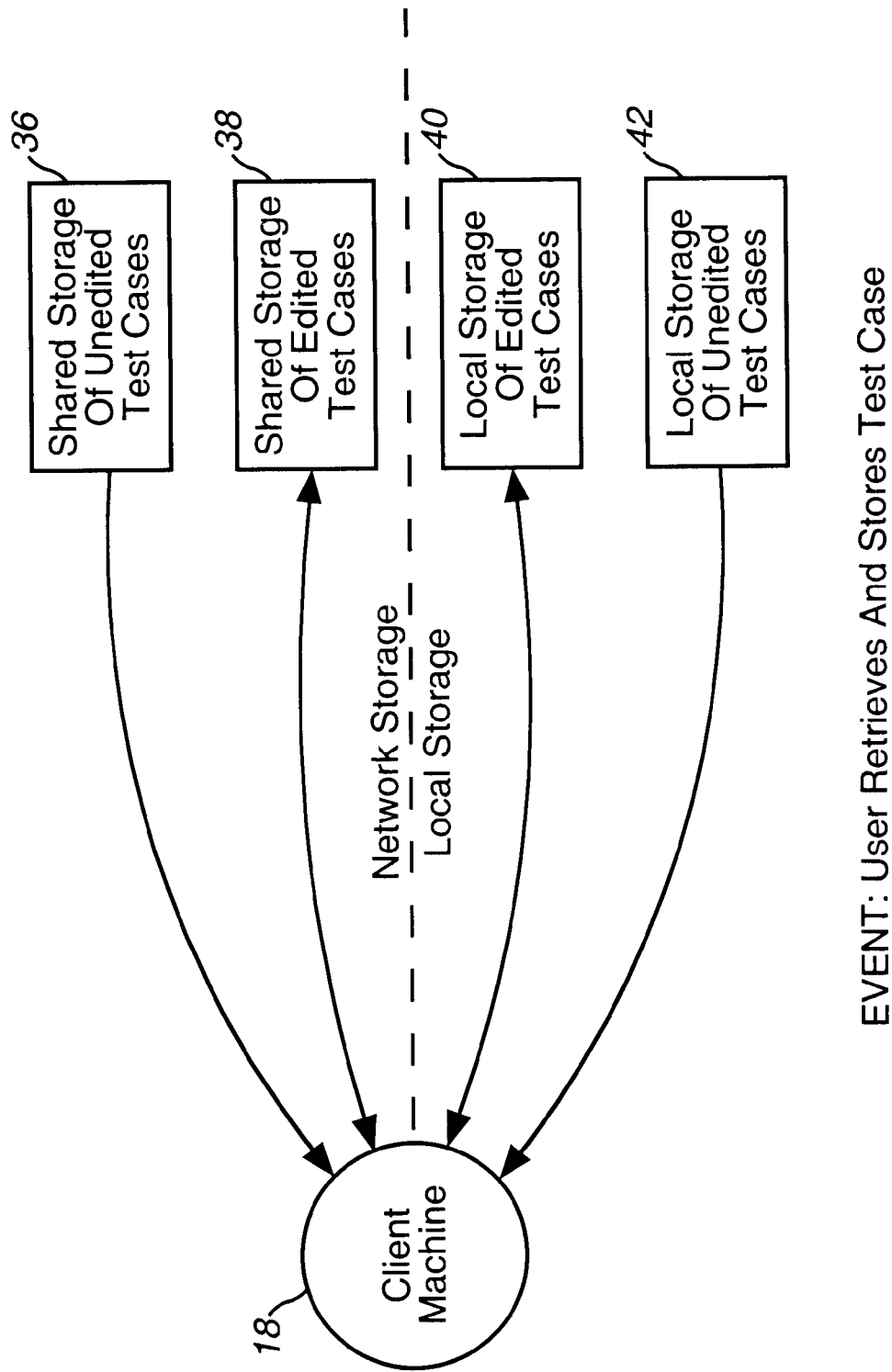
FIG. 4 shows an event in which the user retrieves a desired test case, according to the present invention.

Referring to FIG. 4, after invoking Client Machine 18 the user retrieves the requested test case. The user may ask Client Machine 18 to retrieve the requested test case via a GUI. The user may retrieve case information, such as edited or unedited test case execution data and test case header, from shared or local database storage. The test case header conveys generic information about the test case, such as the test case type, comments on the test case, test case identification, when the test case was created, who created the test case, etc. The test case execution data and test case header are stored in databases, such as relational databases. The user may request an ISDN Custom Server test case, a SS7 Custom Server test case, or a voice path test case for the CG Custom Server.

Shared storage is typically storage on the network, LAN or WAN, such as on a machine running under NT, UNIX or OS/2 operating system while local storage is typically storage on Client Machine 18 itself. The type of storage medium for both shared and local storage of unedited test cases includes but is not limited to disk or memory such as ROM (read only memory), PROM (programmable read only memory), cache, tape, and CD ROM (compact disk read only memory). The type of storage medium for both shared and local storage of edited test cases includes but is not limited to disk or memory such as RAM (random access memory) and cache.

If the user retrieves unedited test case execution data, or a test case header from either shared or local storage, the unedited file may only be read and not written. It can be written to the share or local storage for edited test cases after being copied to a new file name. If, however, the user retrieves an edited file, it may be further edited and stored at will. In this manner, the integrity of the unedited or "baseline" test case is preserved. After the user has retrieved and used a test case, it may be stored back to the appropriate storage medium. If the user has retrieved an edited test case from Shared Storage 38 or Local Storage 40 or has edited a previously edited or unedited test case from Shared Storage 36 or Local Storage 42, the test case can only be stored in local or shared storage for edited test cases 38 or 40. If, however, the user has retrieved, used and not edited an unedited test case, the unedited test case need not be stored at all since it is already available in shared or local storage of unedited test cases 36 or 42.

Figure 5:
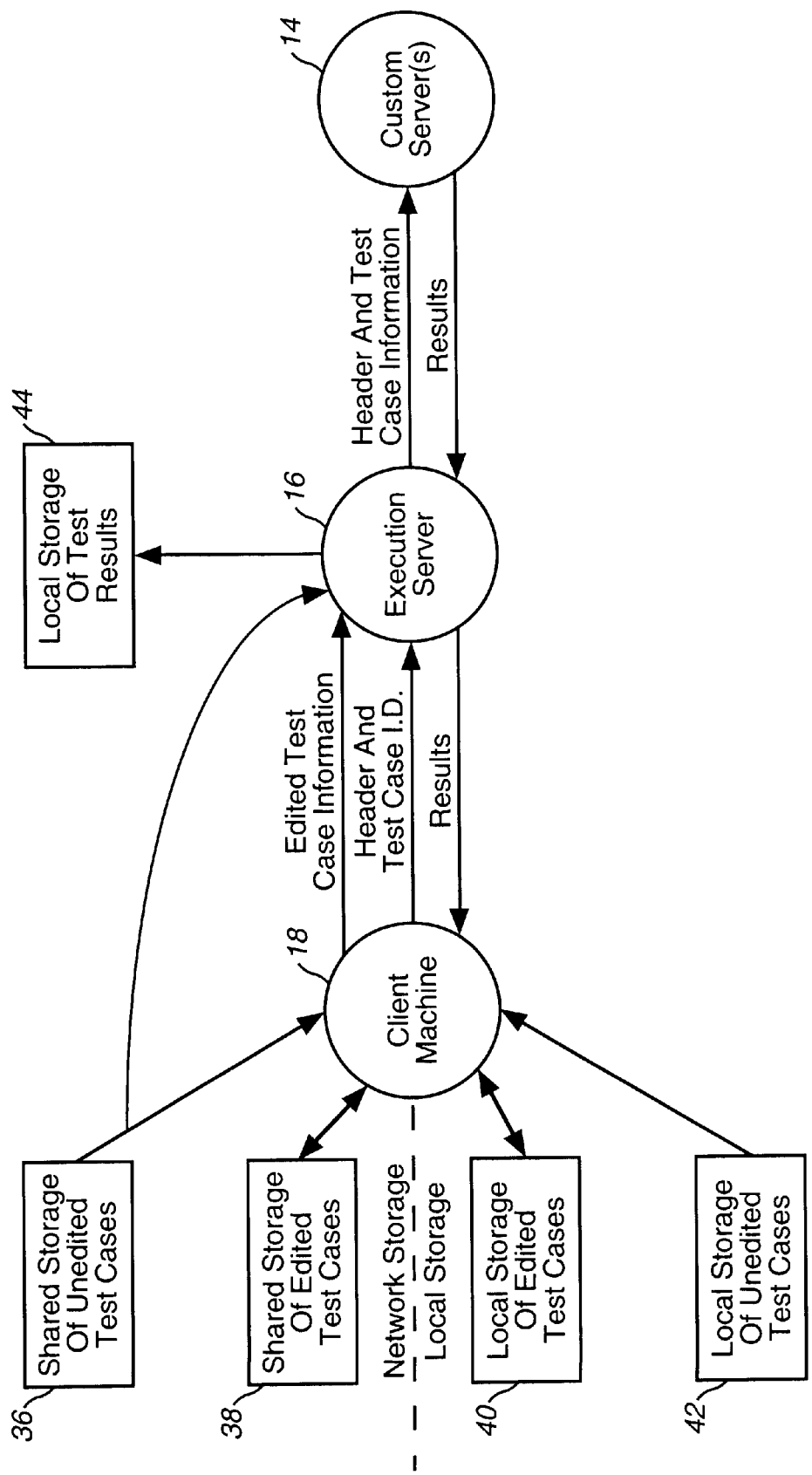
FIG. 5 shows an event in which the user executes a requested test case, according to the present invention.

Referring to FIG. 5, after the user has retrieved the desired test case, the user next requests that a test case, either edited or unedited, be executed. If the user wishes to execute an edited test case, the edited test case must be supplied to Execution Server 16 from Shared Storage of Edited Test Cases 38 or Local Storage of Edited Test Cases 40 via Client Machine 18, as described above in conjunction with FIG. 4. If, however, the user is executing an unedited test case, the test case may be supplied to Execution Server 16 directly from Shared Storage of Machine 18. The user can request that a test case or list of test cases be executed immediately or at some later time (batch). If the test cases are submitted to run in batch, Execution Server 16 will start the execution at the requested time without further intervention by the user.

Execution Server 16 provides the header and test case information to Custom Server 14 that actually executes the test case requested by the user. As previously noted, Custom Server 14 may be ISDN Custom Server 22, CG Custom Server 26 or SS7 Custom Server 28 shown in FIG. 2. Once Custom Server 14 completes execution of the requested test case, the test results are communicated to Execution Server 16 by Custom Server 14. Execution Server 16 stores the test results in Local Storage of Test Results 44 and, if the test case was submitted for immediate execution, the test results are immediately communicated back to Client Machine 18 in a "real time" fashion. On the other hand, if the user requested a batch execution, the user must retrieve the test results from Local Storage of Test Results 44. As with other storage mediums previously discussed, Local Storage of Test Results 44 may be any storage medium such as memory, disk or cache. Local Storage of Test Results 44 may be placed on the LAN or WAN network so that it may be accessed by other users on the system if so desired.

Figure 6:
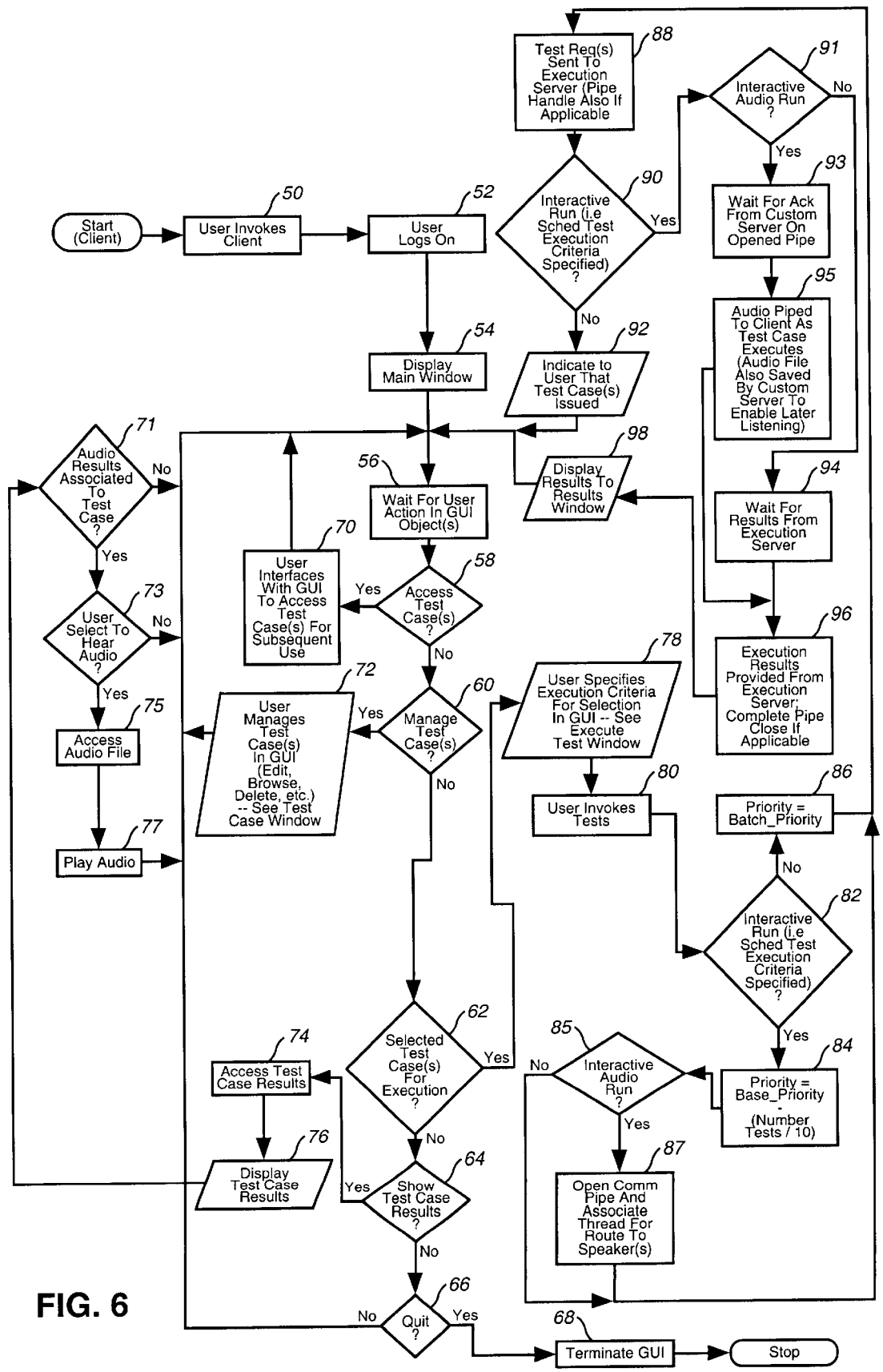
FIG. 6 depicts a flow chart illustrating the operation of the client machine, according to the present invention.

Referring to FIG. 6, a flow chart illustrating the operation of Client Machine 18 is shown. First, the user invokes Client Machine 18 (step 50) and validation is performed as the user logs onto Client Machine 18 (step 52), as described in conjunction with FIG. 3. Next, the main window of the GUI (graphical user interface) is displayed (step 54). The Client Machine 18 then waits for user action in GUI object(s) (step 56). The user must decide whether to access test case(s) (step 58).

If the user does decide to access test case(s), then the user interfaces with the GUI to access the desired test cases for subsequent use (step 70), and then Client Machine 18 must again wait for user action in GUI object(s) (step 56). If, on the other hand, the user does not wish to access test case(s), the system inquires as to whether the user wishes to manage the accessed test case(s) (step 60). If the user does wish to manage the accessed test case(s), then the user can use the GUI to manage the accessed test case(s) by editing, browsing, deleting or performing other desired functions to the accessed test case(s) (step 72).

If the user does not wish to manage the accessed test case(s), the method inquires as to whether the user wishes to select test case(s) for execution (step 52). If the user does not wish to select test case(s) for execution, the system inquires as to whether the test case(s) results should be shown (step 64). If the user desires the test case results be shown, the test case results are accessed from Local Storage of Test Results 44 (step 74). The test case results are displayed (step 76). The system next inquires whether audio results are associated with the test case (step 71). If not, the system returns to step 56. If audio results are associated with the test case, then the user can select to hear the audio results (step 73). In that case, the audio files are accessed (step 75) and played (step 77). Conversely, if the user does not wish the test case results shown, the user is queried to quit (step 66). If the user does not want to quit the flow is directed back to step 56, but if the user does want to quit then the GUI is terminated (step 68).

If the user does wish to select test case(s) for execution, then the user specifies the execution criteria to be used for selection in the GUI (step 78). After specifying the execution criteria, the user invokes the test case(s) (step 80). The system inquires as to whether the execution of the test case(s) is to be an interactive run (step 82). An interactive run means that the selected test case is to be executed immediately in "real time" and not at some future time. A non-interactive or batch run is a run in which the test execution criteria is scheduled at some future time and may be executed in the background, invisible to the GUI and therefore to the user. If the test execution is not to be an interactive run, the test case is assigned a priority based upon the test case's position in a batch queue (step 86). If, however, the test execution is to be an interactive run, then the test case is assigned an interactive priority determined by a priority formula (step 84).

Interactive runs are assigned a priority determined by the priority formula while non-interactive or batch runs are assigned a priority based upon batch priority. Interactive runs always have a higher priority than batch runs. Thus, for example, in a priority buffer having 256 positions, the lower positions 1–128 may be reserved for batch runs while the higher positions 129–256 may be reserved for interactive runs. The batch priority determines the position of the test case in the batch queue. The priority formula for interactive runs is slightly more complex. The priority formula is determined by subtracting the number of test cases the user wishes to run from a base priority value. The base priority value is a predetermined value given all test cases that are to be executed interactively. The base priority value for a user is set when the user logs on as shown in FIG. 6 (steps 50, 52).

The test case request is communicated to Execution Server 16 (step 88). Next, the system inquires as to whether the user desires an interactive run (step 90). If the user does not wish an interactive run, but instead desires a batch run, then the GUI of Client Machine 18 indicates to the user when the test case results are available in Local Storage of Test Results 44 (step 92). On the other hand, if the run is interactive, the user is queried if it is an interactive audio run (step 91). If not, the user waits for the results of the test case execution (step 94). If the run is an interactive audio run, then the user must wait for acknowledgement from the custom server (step 93). The audio is piped to the client as the test case executes (step 95). These steps are similar to those taken if the priority is high (step 84). Again, the system determines if the run is an interactive test run (step 85). If so, the communications pipeline is open and audio portion is threaded to speakers (step 87). Next, Execution Server 16 will provide the results of the test case execution to Client Machine 18 (step 96). The results of the test case execution are displayed to the results window of the Client Machine GUI (step 98). Finally, the flow returns the user to step 56.

Figure 7:
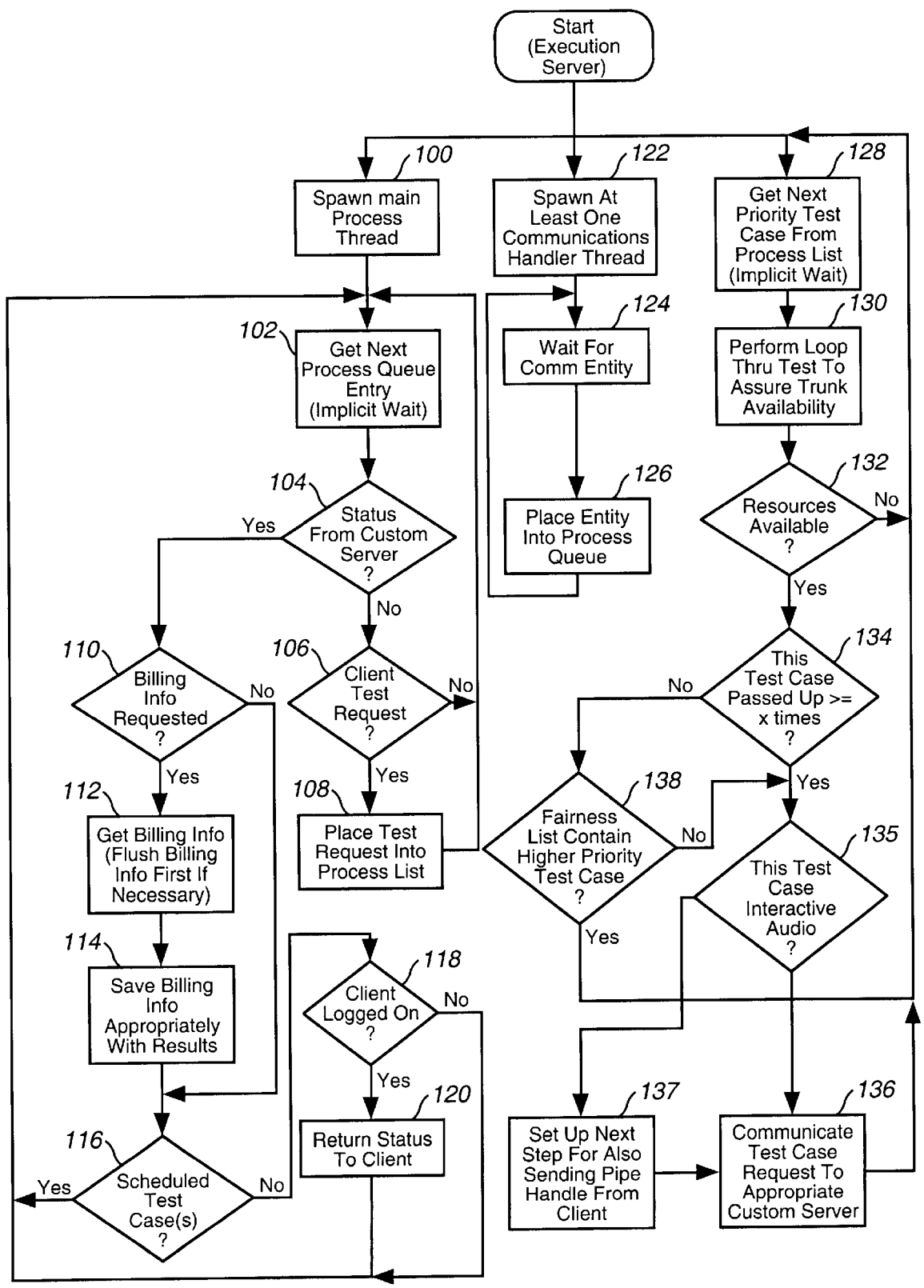
FIGS. 7 and 8 depicts a flow chart illustrating the operation of the execution server and the custom server, respectively, according to the present invention.

Referring to FIG. 7, a flow chart illustrating the operation of Execution Server 16 is shown. Once the process flow of Execution Server 16 is started, one of three different paths may be chosen: the main process thread may be spawned (step 100), at least one communications handler thread may be spawned (step 122), and the next priority test case may be retrieved (step 128). It should be noted that the main process thread (step 100) and the communications handler thread (step 122) are process threads that may be spawned asynchronously, i.e. at different times.

Referring to the first path, the main process thread is spawned (step 100). This is followed by an implicit wait while the next process queue is retrieved (step 102). Next, the inquiry is whether Execution Server 16 has yet received status information on requested test cases from Client Machine 18 (step 104). If not, the system inquires as to whether the user has a test case request (step 106). If the user has no test case request, the process returns to step 102; if, however, the user has a test case request, then the test case request is placed into the process list according to its priority value vis-à-vis the priority assigned to other test requests.

If Execution Server 16 has received status information on requested test cases from Client Machine 18, then billing information concerning the transaction, such as billing information on a telephone call which has been placed, must be analyzed. The question is whether billing information has been requested by the user (step 110). If the user has requested billing information, the Execution Server 16 will make the appropriate number of calls, for example, thirty-two calls if the billing block is comprised of thirty-two calls, to flush the billing record (step 112). The results of the billing record are returned to the user in the interactive mode or saved to storage in the batch mode (step 114).

The issue becomes whether test cases have been scheduled (step 116). If they have been scheduled, the flow is directed back to the beginning of this process thread. If, however, test cases have not been scheduled, the system inquires whether the user is logged onto Client Machine 118 (step 118). If the user is not logged on, the process is routed back up to step 102. However, if the user is logged on status is returned to Client Machine 18 (step 120) before returning to step 102.

Referring to the second path of FIG. 7, at least one communications handler thread is spawned (step 122). Next, Execution Server 16 waits for communications entity (step 124) and places this communications entity into the process queue (step 126). The communications entity monitors messages received from Client Machine 18 and Custom Server (s) 14 on the network. The flow then returns to step 124.

Referring to the third path of FIG. 7, the next highest priority test case is retrieved from the process list (step 128); there is an inherent wait while the test case is retrieved. Next, a loop-through test is performed to assure available of a communications channel, such as a T1 trunk (step 130). The system then inquires as to whether there are enough resources, the flow is routed up to the Start Box until there are adequate resources available (step 132).

If there are adequate resources available to complete execution of the requested test case, the system asks how many times the particular test case request has been bypassed and not executed (step 134). The system then inquires whether the test case contains interactive audio (step 135). If so, the system sets up the next step for also sending pipe handle from the client (step 137). If the test case request has been bypassed a certain number of times or more (the number of times is determined by the administrator of the network system), then the priority of the test case request is effectively ignored and that test case is automatically communicated to the appropriate Custom Server 14 (step 136). The flow then returns back to Start. If the test case has not been bypassed a minimum number of times, then the test case request is compared against a priority list to determine whether the test case request has a lower priority than another test (step 138).

Figure 8:
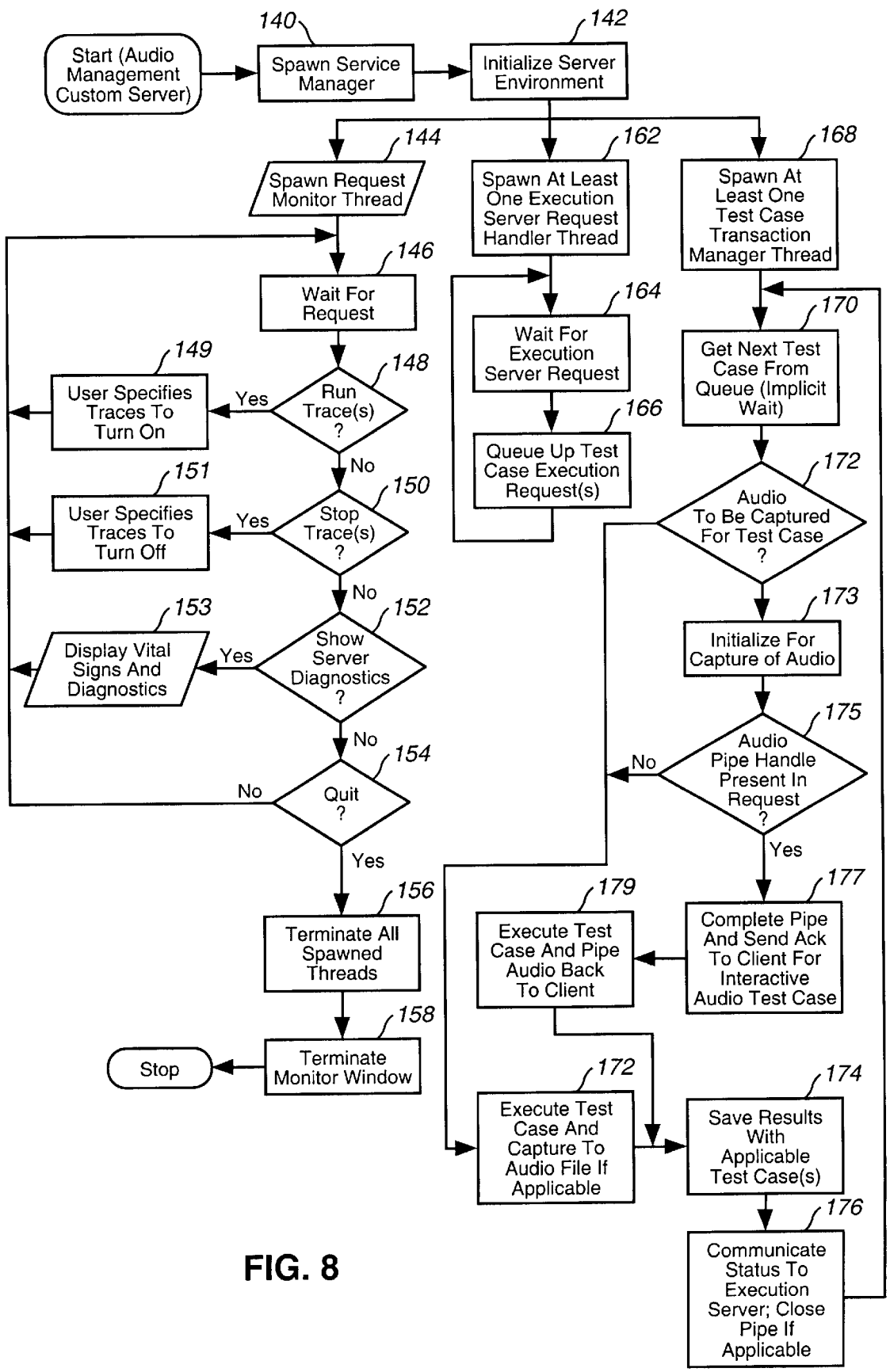

Referring to FIG. 8, a flow chart illustrating the operation of Custom Server 14 is shown. First, a service manager thread is spawned (step 140). The Custom Server environment is then initialized (step 142). Once the service manager is spawned and the Custom Server environment is initialized, one of three different paths may be chosen: a request monitor thread may be spawned (step 144), at least one execution server request handler thread may be spawned (step 162), and at least on test case transaction manager thread may be spawned (step 168). It should be noted that the process threads spawned in steps 144, 162 and 168 may be spawned asynchronously, i.e. at different times.

Referring to the first path, a request monitor thread is spawned (step 144). The Custom Server 14 waits for a test case request (step 146). Next, the system inquires as to whether to run traces which allow the user to see in real-time what processes are running on the network in the background of the GUI (148). If traces are to be run, then the user specifies which traces to turn on (step 149). If traces are not to be run, then the flow proceeds and inquires whether to stop the traces (step 150). If traces are to be stopped, the system requires that the user specify which traces to turn off (step 151); if, on the other hand, traces are not to be stopped then the decision asks whether Custom Server diagnostics are to be shown (step 152). Custom Server diagnostics provide status information on the Custom Server 14 such as the types of test cases being run, the number of test cases being run, the status of the test cases being run and the users logged onto the network. If diagnostics are to be shown, then diagnostics are displayed (step 153). If diagnostics are not to be shown, then the system inquires whether to quit the flow (step 154). If the flow is not to be quit, then it returns to step 146. If the flow is to be quit, then all spawned threads are terminated (step 156) and the monitor function is terminated (step 158).

Referring to the second path, at least one execution server request handler thread is spawned (step 162). Next, the Custom Server 14 waits for a test case execution request from Execution Server 16 (step 164). Finally, test case execution requests are queued up (step 166).

In the third path of the flowchart of FIG. 8, at least one test case transaction manager thread is spawned (step 168). Next, the next test case is obtained from the process queue during which there is an implicit wait (step 170). The system inquires whether audio is to be captured for the test case (step 171). If so, the system must be initialized to capture audio (step 173). The audio pipeline handle must be present in the request (step 175). If so, the pipeline is complete and an acknowledgement is sent to the client (step 177). The test case is executed and the audio is pipelined back to the client (step 179). If the audio pipeline handle is not present in step 175, the test is executed and any audio is captured to an audio file (step 172). The results of the test case execution are saved with the test case data and the status is communicated to Execution Server 16 (step 174). Results of the test case execution may include a variety of information such as all execution data, tests that pass, tests that fail and summary data. The process flow then returns to Block 170.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A system for heterogeneous network testing comprising:
   (a) at least one client machine on a network;
   (b) an execution server on the network having a communications link with the at least one client machine, wherein the at least one client machine communications with the execution server over the communications link; and
   (c) at least one custom server on the network having a communications link with the execution server, wherein the at least one custom server is managed by the execution server and executes a requested interactive audio test case in accordance with a priority determined by the execution server at least based on the requested interactive audio test case.

2. The system of claim 1, wherein the at least one client machine has a graphical user interface which allows a user to manage a test case to be executed on the network.

3. The system of claim 1, wherein the execution server is a multitasking server.

4. The system of claim 1, wherein the at least one custom server is a multitasking custom server.

5. The system of claim 1, wherein the custom server pipes audio information to the at least one client machine as the requested interactive audio test case is executed.

6. The system of claim 1, further comprising an audio pipeline handle that is associated with the requested interactive audio test case.

7. A system for heterogeneous network testing comprising:
   (a) a plurality of client machines on a network;
   (b) an execution server on the network having a communications link with each of the plurality of client machines, wherein the plurality of client machines communicate with the execution server over the communications link; and
   (c) a plurality of custom servers on the network having a communications link with the execution server, wherein a custom server of the plurality of custom servers is managed by the execution server and is capable of executing an interactive audio test case in accordance with a priority determined by the execution server at least based on the requested interactive audio test case.

8. The system of claim 7, wherein a client machine of the plurality of client machines has a graphical user interface which allows a user to edit the test case and to manage execution of the test case.

9. The system of claim 7, wherein the execution server is a multitasking server.

10. The system of claim 7, wherein each custom server of the plurality of custom servers is a multitasking custom server.

11. The system of claim 7, wherein the custom server pipes audio information to at least one client machine as the requested interactive audio test case is executed.

12. A method for heterogeneous network testing of a network product, comprising the steps of:
   requesting an interactive audio test case to be executed on a network by a custom server, wherein the step of requesting the test case is made to a client machine on a network;
   retrieving the interactive audio test case from a storage medium;
   assigning a priority to the audio test case retrieved from the storage medium;
   communicating the audio test case form the client machine to the execution server; and
   executing the test case by a custom server on the network based at least on the priority and the interactive audio test case.

13. The method of claim 12, wherein the step of requesting an audio test case comprises communicating the audio test case to be executed to the client machine via a graphical user interface.

14. The method of claim 12, wherein the audio test case retrieved from the storage medium comprises an audio test case execution data and a test case header which are retrieved from the storage medium.

15. The method of claim 12, wherein the storage medium is a shared storage medium on the network.

16. The method of claim 12, wherein after the step of requesting the audio test case, comprising the further step of:
   requesting a specific custom server to perform the audio test case.

17. The method of claim 16, wherein after the step of requesting a specific custom server to perform the test case, comprising the further step of:
   storing an identifier of the specific customer server in a local memory of the client machine.

18. The method of claim 12, wherein after the step of retrieving the test case from the storage medium, comprising the further step of:
   editing the test case through the use of a graphical user interface on the client machine.

19. The method of claim 18, wherein the edited test case may not be stored in a storage medium for unedited test cases but may be stored in a storage medium for edited test cases.

20. The method of claim 18, wherein after the step of editing the test case, comprising the further step of:
   determining whether execution of the test case should be an interactive execution or a scheduled execution.

21. The method of claim 12, wherein after the step of retrieving the test case from the storage medium, comprising the further step of:

determining whether execution of the test case should be an interactive execution or a scheduled execution.

22. The method of claim 12, wherein after the step of communicating the test case from the client machine to the execution server, comprising the further step of:

initiating an execution of the test case by the execution server.

23. The method of claim 12, wherein after the step of executing the test case by the custom server, comprising the further step of:

communicating the results of the executed test case to the execution server.

24. The method of claim 23, wherein if the custom server performed an interactive execution of the test case, the results of the executed test case are also communicated immediately to the client machine.

25. The method of claim 12, wherein after the step of executing the test case by the custom server, comprising the further step of:

storing the results of the executed test case in a shared storage medium which may be accessed by a plurality of users on the network.

26. The method of claim 12, further comprising piping audio information to at least one client machine as the requested interactive audio test case is executed.

* * * * *